United States Patent [19]

Hiramatsu et al.

[11] Patent Number: 4,786,255
[45] Date of Patent: Nov. 22, 1988

[54] GROUP EDUCATION SYSTEM

[75] Inventors: Tamihei Hiramatsu, Kanagawa; Taiji Kitami, Chiba; Tetsuzo Kano; Akira Masuda, both of Kanagawa; Yoshiko Matsushita; Ryuji Suzuki, both of Tokyo; Shigeki Wakatani; Isao Matsumoto, both of Kanagawa, all of Japan

[73] Assignee: Sony Corporation, Tokyo, Japan

[21] Appl. No.: 72,539

[22] Filed: Jul. 13, 1987

[30] Foreign Application Priority Data

Jul. 17, 1986 [JP] Japan ............................ 61-168763

[51] Int. Cl.$^4$ ............................................. G09B 5/02
[52] U.S. Cl. ............................................. 434/157
[58] Field of Search ................................... 434/157

[56] References Cited

U.S. PATENT DOCUMENTS 4,333,160  6/1982  Kobari et al. .
4,363,049 12/1982  Ohtsuki et al. .
4,368,988  1/1983  Tahara et al. .
4,412,305 10/1983  Yoshida .......................... 434/157
4,579,533  4/1986  Anderson et al. ................ 434/157
4,591,929  5/1986  Newsom .
4,615,680 10/1986  Tomatis .

FOREIGN PATENT DOCUMENTS 0127534 12/1984 European Pat. Off. .

Primary Examiner—Leo P. Picard
Attorney, Agent, or Firm—Philip M. Shaw, Jr.

[57] ABSTRACT

A group education system including a first memory for storing an original sentence group, a second memory for storing a starting address, an end address of a sentence block of an original sentence group stored in the first memory, a control circuit for controlling the selection of a playback mode and the reading order of the sentence blocks of the original sentence group stored in the first memory and the change of the pause times thereof and a third memory for storing the reading order, the starting address, the end address and the altered pause times of the selected sentence block under the control of the control circuit. Accordingly, it becomes possible to form with ease a sentence group in which the playback mode and the reproducing order of the selected sentence block are selected and the pause times between the sentence blocks are changed.

6 Claims, 5 Drawing Sheets

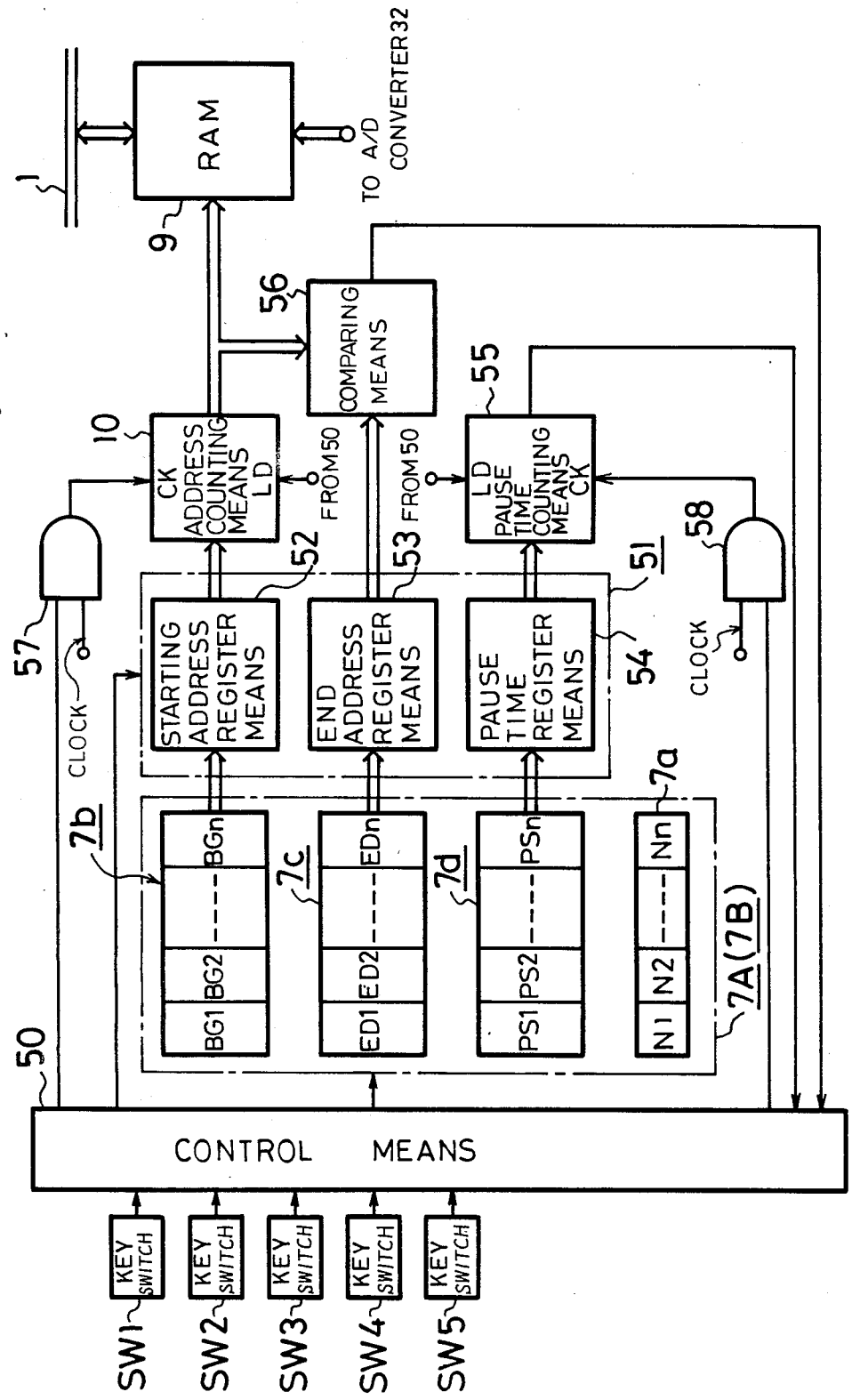

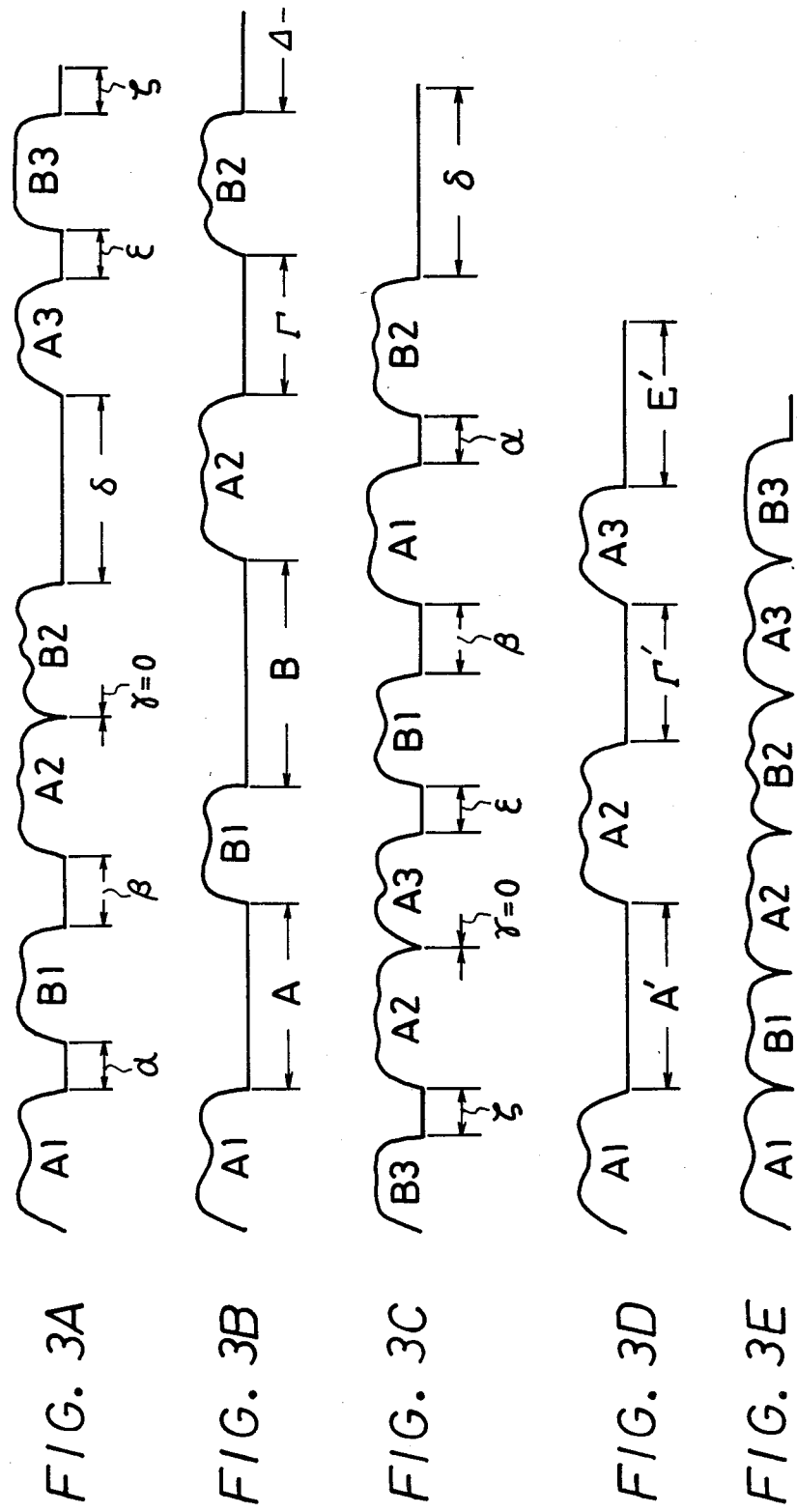

FIG. 4A

| SENTENCE NO. | STARTING ADDRESS | END ADDRESS | PAUSE TIME |
|---|---|---|---|
| A1 | a | b | α |
| B1 | b+1 | c | β |
| A2 | c+1 | d | γ |
| B2 | d+1 | e | δ |
| A3 | e+1 | f | ε |
| B3 | f+1 | g | ζ |

FIG. 4B

| | SENTENCE NO. | STARTING ADDRESS | END ADDRESS | PAUSE TIME |
|---|---|---|---|---|
| A1 | 1 | a | b | A |
| B1 | 2 | b+1 | c | B |
| A2 | 3 | c+1 | d | Γ |
| B2 | 4 | d+1 | e | Δ |
| A3 | 5 | e+1 | f | E |
| B3 | 6 | f+1 | g | Z |

FIG. 4C

| | SENTENCE NO. | STARTING ADDRESS | END ADDRESS | PAUSE TIME |
|---|---|---|---|---|
| B3 | 1 | f+1 | g | ζ |
| A2 | 2 | c+1 | d | γ |
| A3 | 3 | e+1 | f | ε |
| B1 | 4 | b+1 | c | β |
| A1 | 5 | a | b | α |
| B2 | 6 | d+1 | e | δ |

FIG. 4D

|  | SENTENCE NO. | STARTING ADDRESS | END ADDRESS | PAUSE TIME |
|---|---|---|---|---|
| A1 | 1 | a | b | A' |
| A2 | 2 | c+1 | d | Γ' |
| A3 | 3 | e+1 | f | E' |
|  |  |  |  |  |
|  |  |  |  |  |
|  |  |  |  |  |

FIG. 4E

|  | SENTENCE NO. | STARTING ADDRESS | END ADDRESS | PAUSE TIME |
|---|---|---|---|---|
| A1 | 1 | a | b | 0 |
| B1 | 2 | b+1 | c | 0 |
| A2 | 3 | c+1 | d | 0 |
| B2 | 4 | d+1 | e | 0 |
| A3 | 5 | e+1 | f | 0 |
| B3 | 6 | f+1 | g | 0 |

GROUP EDUCATION SYSTEM

BACKGROUND OF THE INVENTION

1. Field of the Invention

The present invention relates generally to a group education system and, more particularly, is directed to a group education system for use with language laboratories.

2. Description of the Prior Art

LL (language laboratory) systems may be regarded as a special type of teaching machine whose object is to train students in the oral use of foreign languages.

Conventional LL systems may employ a tape recorder as memory means for storing teaching material (text). This type of LL system is disclosed, for example, in U.S. Pat. No. 3,969,831. Other known LL systems are arranged to employ, instead of the above tape recorder, a semiconductor memory to store the teaching material. This type of LL system using the semiconductor memory is disclosed, for example, in the published documents of Japanese Laid-Open Patent Application Nos. 59-129889 and 59-224897 which were previously proposed by the assignee of the present application.

With the known LL system using the tape recorder, when it is intended to improve the learning effect of the students, for example, by selecting lines of only one of two speakers, exchanging two lines, selecting lines, varying pause periods or the like, it is necessary for the teacher or third person to make various teaching materials in accordance with the respective learning contents and the learning levels by doing very cumbersome works, such as dubbing the learning contents of the original teaching material recorded on a master tape on to a slave tape, editing and recording the teaching material on the slave tape. Even in the classroom, the teacher must operate a teacher terminal apparatus to switch the lines of each speaker from tape to tape to change the learning contents (studying contents) in accordance with the learning schedule at each time.

OBJECTS AND SUMMARY OF THE INVENTION

Accordingly, it is an object of this invention to provide an improved group education system.

It is another object of this invention to provide a group education system using a semiconductor memory as memory means for storing teaching material and which can, on the basis of, for example, an original sentence group of teaching material recorded on a master tape, easily form the sentence group in which the playback mode and the order of reproducing the selected sentence blocks are selected and the pause time between the sentence blocks is varied.

It is a further object of this invention to provide a group education system for use with a language laboratory system.

According to one aspect of the present invention, there is provided a group education system comprising:

(a) first memory means for storing sentence blocks of an original sentence group;

(b) second memory means for storing a starting address and an end address of each of said sentence blocks of said original sentence group stored in said first memory means and a pause time between said sentence blocks;

(c) control means for controlling the selection, the reading order and the change of said pause time of said sentence blocks of said original sentence group stored in said first memory means; and (d) third memory means for storing the reading order, the starting address, the end address and the changed pause time of the sentence block selected under the control of said control means.

These and other objects, features and advantages of the present invention will become apparent from the following detailed description of the preferred embodiment that is to be read in conjunction with the accompanying drawings, throughout which like reference numerals identify like elements and parts.

BRIEF DESCRIPTION OF THE DRAWINGS

FIG. 2 is a block diagram showing a part of the arrangement of a teaching machine relating to the group education system of the invention; and FIGS. 3A to 3E and FIGS. 4A to 4E are schematic representations used to explain the teaching machine shown in FIG. 2, respectively.

DESCRIPTION OF THE PREFERRED EMBODIMENT

Figure 1:
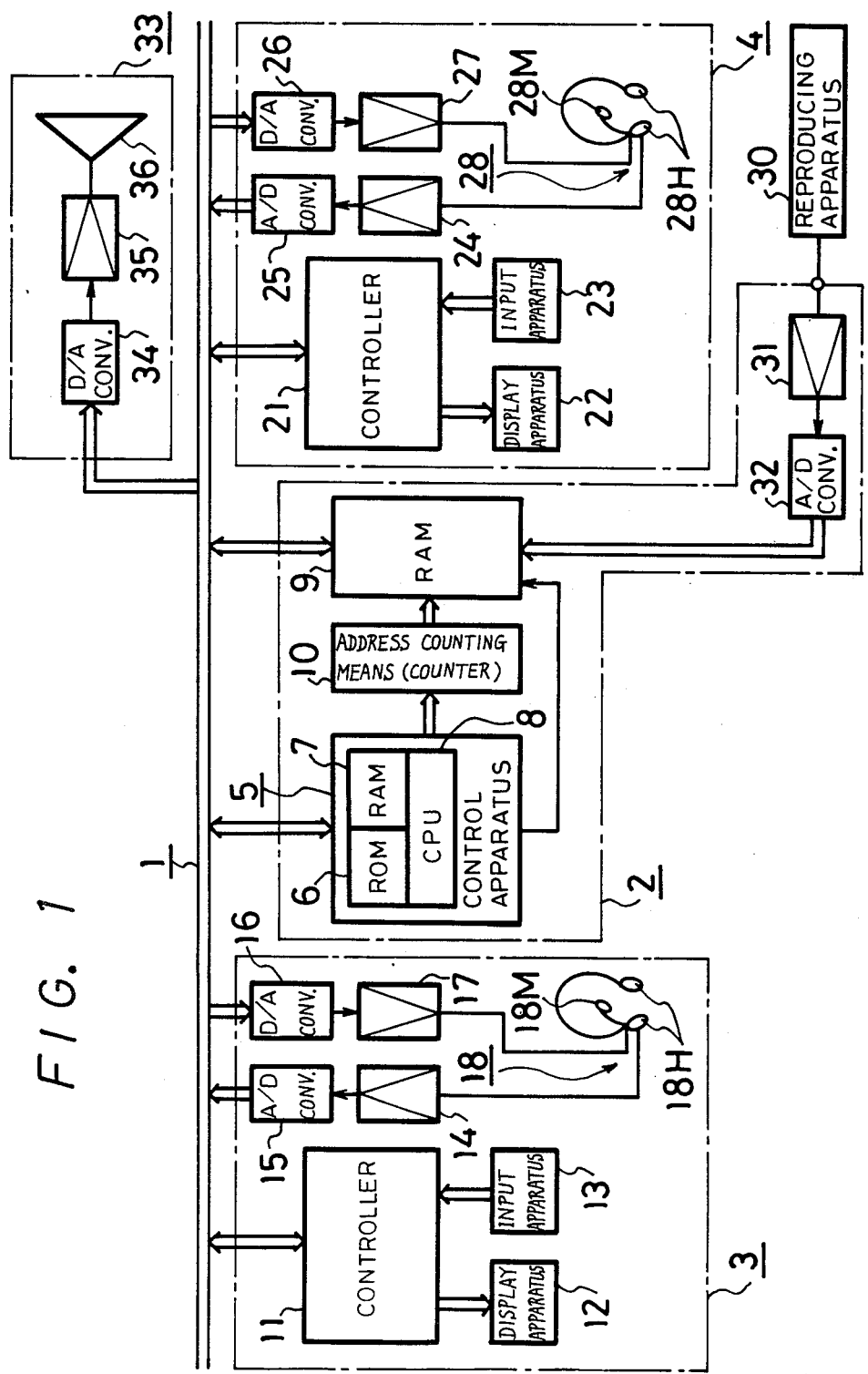
FIG. 1 is a block diagram showing an overall arrangement of an embodiment of a group education system according to the present invention.

Now, an arrangement of a group education system to which the present invention is applied will hereinafter be described with reference to FIG. 1. FIG. 1 schematically illustrates the overall arrangement of the group education system.

Referring to FIG. 1, a system bus 1 is connected with a system control apparatus 2, a teacher terminal apparatus 3, a student terminal apparatus 4 and a common loudspeaker apparatus 33.

The system control apparatus 2 will be described first. The system control apparatus 2 comprises a semiconductor memory 9 such as a RAM (random access memory) for storing an original sentence group such as a conversation and so on, address counting means (counter) 10 used for the RAM 9 and a control apparatus (microcomputer) 5. The control apparatus 5 is formed of a CPU (central processing unit) 8, a ROM (read only memory) 6 and a RAM 7. The control apparatus 5 is adapted to control the RAM 9, the address counting means 10 and the whole of the group education system. A reproducing apparatus 30 such as a tape recorder or the like is adapted to reproduce the original sentence group such as a conversation recorded on an original teaching material (not shown).

The reproduced original sentence group from the reproducing apparatus 30 is amplified by an amplifier 31, converted to a digital signal by an A/D (analog-to-digital) converter 32 and then supplied to the RAM 9, in which only each of the sentence blocks of the original sentence group is written. In this case, a sentence number, a starting address, an end address and a pause time of each of the sentence blocks of the original sentence group written in the RAM 9 are written in the RAM 7 of the control apparatus 5.

When the original sentence group is loaded to the RAM 9 from the reproducing apparatus 30, such loading is displayed on a display apparatus 12 in the teacher terminal apparatus 3 and on a display apparatus 22 in the student terminal apparatus 4 to inform a student that accessing by an input apparatus 23 in the student terminal apparatus 4 is not allowed. The completion of the above loading is displayed on the display apparatus 12 and 22 to inform of both the teacher and the student the accessing of the original sentence group is now possible by the teacher and student terminal apparatus 3 and 4.

The teacher terminal apparatus 3 will now be described. In the teacher terminal apparatus 3, a controller 11 is connected to the system bus 1, an input apparatus 13, such as the keyboard apparatus or the like, and a display apparatus 12. A headset 18 includes a microphone 18M and a headphone 18H. The microphone 18M is connected through an amplifier 14 and an A/D converter 15 to the system bus 1. The system bus 1 is connected to the headphone 18H via a D/A (digital-to-analog) converter 16 and an amplifier 17.

The arrangement of the student terminal apparatus 4 will be described next. In the student terminal apparatus 4, a controller 21 is connected to the system bus 1, and an input apparatus 23, such as a keyboard apparatus, and a display apparatus 22 are connected to the controller 21. Similarly to the headset 18, a headset 28 comprises a microphone 28M and a headphone 28H. The microphone 28M is connected through an amplifier 24 and an A/D converter 25 to the system bus 1. The system bus 1 is connected through a D/A converter 26 and an amplifier 27 to the headphone 28H. It is to be understood that, while not shown, a plurality of the student terminal apparatus 4 of the same construction are respectively connected to the system bus 1.

In this case, the teacher's voice can be superimposed upon the original sentence group reproduced from the reproducing apparatus 30 and then written in the RAM 9. Further, the student's voice can also be written in the RAM 9.

Then, the common loudspeaker apparatus 33 will be described. The common loudspeaker apparatus 33 comprises a D/A converter 34 connected to the system bus 1, an amplifier 35 for amplifying the analog output signal from the D/A converter 34 and a loudspeaker 36 for receiving the amplified output from the amplifier 35. At least, the loudspeaker 36 is located in the classroom, so that all students can hear the sound emanating from the loudspeaker 36.

According to the thus constructed group education system, the original sentence group of the teaching material reproduced by the reproducing apparatus 30 can be written in the RAM 9 by operating the input apparatus 13 in the teacher terminal apparatus 3. At the same time, the teacher or student can hear the original sentence group stored in the RAM 9 as a reproduced sound through the headsets 18 or 28 by operating the input apparatus 13 in the teacher terminal apparatus 3 or the input apparatus 23 in the student terminal apparatus 4. Further, the RAM 9 can be accessed (by designating the sentence number or the pause time in minutes or seconds) just like the fast-forward or rewind operation of a conventional tape recorder by operating the input apparatus 13 in the teacher terminal apparatus 3 or the input apparatus 23 in the student terminal apparatus 4. At that time data, such as an address number to be accessed, are displayed on the display apparatus 12 or 22.

When the teacher operates the input apparatus 13 in the teacher terminal apparatus 3, conversation and training between the teacher and the student, and also between the students, becomes possible through the headset 18 of the teacher terminal apparatus 3 and the headset 28 of the student terminal apparatus 4. In this case, if necessary, the teacher's or students' voice can emanate from the common loudspeaker apparatus 33 and be heard by all of the students by operating the switches (not shown) mounted on the teacher terminal apparatus 3.

FIG. 2 illustrates a part of the detailed arrangement of the teaching material providing machine relating to the above mentioned group education system. In FIG. 2, like parts corresponding to those of FIG. 1 are marked with the same reference numerals and therefore need not be described. FIG. 2 illustrates the arrangement of the control apparatus 5 and the function block of its CPU 8 in FIG. 1, except the RAM (first memory means) 9 and the address counting means (counter) 10.

Referring to FIG. 2, second and third memory means 7A and 7B form a part of the RAM 7 in the control apparatus 5 shown in FIG. 1. A sentence number memory portion 7a is adapted to store the sentence number of the sentence blocks. The sentence number memory portion 7a is formed of areas N1 to Nn which can store n (n=5 in this embodiment) sentence numbers. A starting address memory portion 7b is adapted to store the starting address of each of the sentence blocks and formed of areas BG1 to BGn to store n starting addresses. An end address memory portion 7c is adapted to store the end address of each of the sentence blocks. The end address memory portion 7c is formed of areas ED1 to EDn to store n end addresses. A pause time memory portion 7d is adapted to store a pause time provided between the sentence blocks. This pause time memory portion 7d is formed of areas PS1 to PSn to store n pause times. In this case, the areas N1, BG1, ED1 and PS1 are arranged to belong to the second memory means 7A and other areas N2 to Nn, BG2 to BGn, ED2 to EDn and PS2 to PSn are arranged to belong to the third memory means 7B. The second and third memory means 7A and 7B are controlled by control means 50.

A starting address read out of any area of the starting address memory portion 7b is supplied to starting address register means 52, in which it is registered. An end address read out of any area of the end address memory portion 7c is supplied to end address register means 53, in which it is registered. A pause time read out of any area of the pause time memory portion 7d is supplied to pause time register means 54, in which it is registered. These register means 52 to 54 are controlled by the control means 50.

The starting address from the starting address register means 52 is supplied to the address counting means 10, into which it is loaded. The address counting means 10 was already described in connection with FIG. 1 and therefore need not be described here. Also, a load signal from the control means 50 and a clock signal from an AND gate 57 are both supplied to the address counting means 10. The AND gate 57 is supplied with a control signal from the control means 50, and this control signal will be described later. The address signal from the address counting means 10 is supplied to the RAM 9 and comparing means 56. The end address signal from the end address register means 53 is supplied to the comparing means 56, in which it is compared with the address signal from the address counting means 10. The compared output signal from the comparing means 56 is supplied to the control means 50. The pause time from the pause time register means 54 is supplied to pause time counting means 55, into which it is loaded. The pause time counting means 55 is supplied with a load signal from the control means 50. Also, a clock signal from an AND gate 58 is supplied to the pause time counting means 55. This AND gate 58 is supplied with a control signal from the control means 50 as will be described later. The counted result of the pause time counting means 55 is supplied to the control means 50. The input apparatus 13 of the teacher terminal apparatus 3 is provided with playback mode selecting key switches SW1 to SW5 of which the functions will be described later.

The operation of the group education system shown in FIGS. 1 and 2 will be described with reference to FIGS. 3A to 3E and 4A to 4E.

By way of example, an audio signal such as English conversation is reproduced by using the reproducing apparatus (for example, the tape recorder) 30. The reproduced audio signal is amplified by the amplifier 31 and supplied to the A/D converter 32, in which it is converted to a digital audio signal. Thereafter, this digital audio signal is written in the RAM 9 as a teaching material. As illustrated in FIG. 3A, this teaching material of English conversation is formed of the conversation of two English language speakers. In FIGS. 3A, A1, A2, A3, . . . represent English sentence blocks spoken by one speaker, while B1, B2, B3, . . . represent those spoken by the other speaker. These sentence blocks are alternately repeated as A1, A2, B1, B2, A3, B3, . . . Pause times $\alpha, \beta, \gamma, \delta, \epsilon, \zeta, \ldots$ are provided between the sentence blocks A1 and B1; B1 and A2; A2 and B2; B2 and A3; A3 and B3; B3 and A4 (not shown), . . . In this case, only these sentence blocks A1, B1, . . . are continuously stored in the RAM 9 in turn but the pause times $\alpha, \beta, \gamma$, etc. are not stored therein. The reason for this is that the storage efficiency in storing the sentence blocks in the RAM 9 must be increased. In addition to the above mentioned storage areas, the RAM 9 is provided with storage areas for, for example, 38 students. Accordingly, as compared with the prior art in which the semiconductor memory such as a RAM or the like is provided within the student terminal apparatus 4, it is needless to provide in the student terminal apparatus a control circuit for controlling the RAM and to synchronize the system control apparatus 2 and the teacher terminal apparatus 3. Thus, overall arrangement of the group education system can be simplified and the arrangement of the student terminal apparatus 4 itself can be simplified.

The respective sentence blocks A1, B1, . . . shown in FIG. 3A are given sentence numbers 1 to 6 and then written in the area N1 of the memory portion 7a. The starting addresses a, b+1, . . . of the respective sentence blocks A1, B1, . . . shown in FIG. 3A and in the RAM 9 are written in the area BG1 of the memory portion 7b. The end addresses b, c, . . . of the respective sentence blocks A1, B1, . . . shown in FIG. 3A and in the RAM 9 are written in the area ED1 of the memory portion 7c. Then, the pause times $\alpha, \beta, \ldots$ shown in FIG. 3A are written in the area PS1 of the memory portion 7d. FIG. 4A illustrates the contents of these stored data.

Such sentence blocks stored in the RAM 9 can be selected and read out in a desired sequential order. At the same time, the pause time provided between the sentence blocks can be freely varied.

As illustrated in FIGS. 3B and 4B, the pause times after the respective sentence blocks A1, B1, . . . are respectively extended to A, B, . . . so as to become equivalent to the durations of time of the sentence blocks A1, B1, . . . As a result, it becomes possible for the student to learn each sentence block repetitively. In this case, the sentence blocks A1, B2, . . . of FIG. 3B are respectively given the sentence numbers 1 to 6 and then written in the area N2 of the memory portion 7a. The starting addresses a, b+1, . . . of the sentence blocks A1, B1, . . . shown in FIG. 3B and in the RAM 9 are written in the area BG2 of the memory portion 7b. The end addresses b, c, . . . of the sentence blocks A1, B1, . . . shown in FIG. 3B and in the RAM 9 are written in the area ED2 of the memory portion 7c. The pause times A, B, . . . of FIG. 3B are written in the area PS2 of the memory portion 7d. In this case, the time duration of each pause time is freely determined in response to the learning process regardless of the lengths of the sentence blocks A1, B1, . . .

Referring to FIGS. 3C and 4C, the sentence blocks are reproduced at random on the basis of random numbers generated from a random number generating means (not shown) provided within the CPU 8. In this case, the respective sentence blocks B3, A2, A3, B1, A1 and B2 shown in FIG. 3C are given the sentence numbers 1 to 6 and then written in the area N3 of the memory portion 7a. The starting addresses f+1, c+1, e+1, b+1, a, d+1 of the sentence blocks B3, A2, A3, B1, A1 and B2 shown in FIG. 3C and in the RAM 9 are written in the area BG3 of the memory portion 7b. The end addresses g, d, f, c, b and e of the sentence blocks B3, A2, A3, B1, A1 and B2 shown in FIG. 3C and in the RAM 9 are written in the area ED3 of the memory portion 7c. The pause times $\zeta, \gamma, \epsilon, \beta, \alpha$ and $\delta$ of FIG. 3C are written in the area PS3 of the memory portion 7d. The above mentioned random number generating means may be provided independently of the CPU 8. Alternatively, the CPU 8 may be arranged to have the function to generate random numbers.

As illustrated in FIGS. 3D and 4D, the sentence blocks of one group, for example, B1, B2, B3, . . . of one speaker are eliminated from the sentence blocks A1, B1, A2, B2, A3, B3, . . . shown in FIG. 3A to thereby enable the student to practice English conversation. Corresponding pause times A', Γ' and E' are provided at the places where the sentence blocks B1, B2, B3 are eliminated. In this case, the sentence blocks A1, A2 and A3 shown in FIG. 3D are given sentence numbers 1, 2 and 3 and then written in the area N4 of the memory portion 7a. The starting addresses a, c+1 and e+1 of the sentence blocks A1, A2 and A3 shown in FIG. 3D and in the RAM 9 are written in the area BG4 of the memory portion 7b. The end addresses b, d and f of the sentence blocks A1, A2 and A3 shown in FIG. 3D and in the RAM 9 are written in the area ED4 of the memory portion 7c. The pause times A', Γ' and E' shown in FIG. 3D are written in the area PS4 of the memory portion 7d. In this case, the durations of time of the respective pause times A', Γ' and E' are not dependent on the durations of time of the respective eliminated sentence blocks B1, B2 and B3 but can be properly determined in accordance with the learning stages. For example, in the beginner's class, the durations of time of the respective pause times A', Γ' and E' are selected to be a little longer than those of the sentence blocks B1, B2 and B3. They are selected to be shorter as the learning stage of the student is advanced.

As illustrated in FIGS. 3E and 4E, the pause time between the sentence blocks A1 and B1, the pause time between the sentence blocks B1 and A2, . . . shown in FIG. 3A are completely eliminated or made zero to enable the students to practice, for example, hearing and interpreting English conversation, etc. In this case, the sentence blocks A1, B1, ... shown in FIG. 3E are given sentence numbers 1, 2, ... 6 and then written in the area N5 of the memory portion 7a. The starting addresses a, b+1, ... of the sentence blocks A1, B1, ... shown in FIG. 3E and in the RAM 9 are written in the area BG5 of the memory portion 7b. The end addresses b, c, ... of the sentence blocks A1, B1, ... shown in FIG. 3E and in the RAM 9 are written in the area ED5 of the memory portion 7c. The pause times 0, 0, ... 0 in FIG. 3E are written in the area PS5 of the memory portion 7d.

Accordingly, when any of the playback mode selecting key switches SW1 to SW5 is operated, any one of the playback modes shown in FIGS. 3A to 3E and FIGS. 4A to 4E are selected and the sentence blocks are read out of the RAM 9 in response to the contents stored in the memory means 7A and 7B and the pause times thereof are controlled.

The operation of the group education system shown in FIG. 2 will be described more fully in connection with, for example, FIGS. 3A and 4A.

The starting address a, the end address b and the pause time $\alpha$ of the sentence block A1 are respectively read out of the areas BG1, ED1 and PS1 of the memory portions 7a, 7b and 7c and then registered in the starting address register means 52, the end address register means 53 and the pause time register means 54. The starting address a in the starting address register means 52 is loaded into the address counting means 10. The pause time $\alpha$ from the pause time register means 54 is loaded onto the pause time counting means 55. When the clock signal from the AND gate 57 is supplied to the address counting means 10, the address counting means 10 incrementally counts the clock signal from the address a, and the sentence block A1 is read out from the RAM 9 in response thereto. Then, the comparing means 56 compares the counted content of the address counting means 10 and the end address b of the end address register means 53. When both of them coincide with each other, the comparing means 56 generates a coincidence output, which is then supplied to the control means 50. Accordingly, the control means 50 generates a control signal by which the AND gate 57 is turned off and the address counting means 10 is stopped counting. At the same time, the pause counting means 55 counts the clock signal from the AND gate 58 decrementally from the initial value $\alpha$. When the counted content of the pause counting means 55 becomes zero, the starting address b+1, the end address c and the pause time $\beta$ of the sentence block B1 are read out of the areas BG1, ED1 and PS1 of the memory portions 7b, 7c and 7d and then registered in the starting address register means 52, the end address register means 53 and the pause time register means 54, respectively. Subsequently, the similar operations are repeatedly carried out for the next sentence block B1.

The sentence number stored in the memory portion 7a is displayed on the display 12 or 22.

According to the present invention, as set forth above, it becomes possible to obtain a group education system which can easily produce a sentence group in which the playback mode and the order of reproducing the sentence blocks are selected and the pause times between the sentence blocks are varied.

The above description is given on a single preferred embodiment of the invention but it will be apparent that many modifications and variations could be effected by one skilled in the art without departing from the spirit or scope of the novel concepts of the invention, so that the scope of the invention should be determined by the appended claims only.

We claim as our invention:

1. A group education system of the type which selectively records and replays spoken sentences, which are composed of words separated by pauses, wherein the system comprises:
    (a) first memory means for storing data representing sentence blocks of a spoken, original sentence group;
    (b) second memory means for storing a starting address and an end address of data representing each of said sentence blocks of said original sentence group data stored in said first memory means and data representing pause times between said sentence blocks;
    (c) control means for controlling the selection of the order in which said sentence blocks of said original sentence group data are read out from said first memory means and for changing the pause time data stored in said second memory means for one or more selected sentence blocks so as to change the pause time lengths, said control means being connected to said second memory means for selectively reading out the data from said second memory means; and
    (d) third memory means, responsive to the control means, for storing the starting address, the end address and the changed pause time data of the one or more sentence blocks selected by said control means.

2. A group education system of the type which selectively records and replays spoken sentences which are composed of words separated by pauses, wherein the system comprises:
    first memory means for storing data representing sentence blocks of spoken teaching material, less the pause times;
    second memory means for storing a starting address and an end address of each of said sentence blocks stored in said first memory and data representing pause times between said sentence blocks;
    control means, including selecting switches, for controlling the selection of the order in which data is readout from said first memory means and for changing the lengths of the pause times;
    third memory means for storing the reading order, the starting address, the end address and the changed pause times of the sentence blocks selected under the control of said control means; and
    read control means for controlling the reading operation from said first memory means on the basis of said control means and an output signal from said third memory means.

3. A group education system according to claim 2, wherein said second memory means comprises a sentence number memory portion for storing a sentence number of said sentence blocks, a starting address memory portion for storing the starting addresses of said sentence blocks, an end address memory portion for storing the end addresses of said sentence blocks and a pause time memory portion for storing the data representing the pause times between said sentence blocks.

4. A group education system according to claims 2 or 3, wherein said third memory means comprises a sentence number memory portion for storing sentence numbers of one or more sentence blocks selected by said control means, a starting address memory portion for storing starting addresses of one or more sentence blocks selected by said control means, an end address memory portion for storing end addresses of one or more sentence blocks selected by said control means and a pause time memory portion for storing data representing the pause times between one or more sentence blocks selected by said control means.

5. A group education system according to claim 4, wherein said read control means includes a starting address register means for registering a selected starting address read out of the starting address memory portion of said third memory means, an end address register means for registering a selected end address read out of the end address memory portion of said third memory means and a pause time register means for registering data representing a selected pause time read out of the pause time memory portion of said third memory means.

6. A group education system according to claim 5, wherein said read control means includes address counting means into which a selected starting address from said starting address register means is loaded and comparing means for comparing the counted content of said address counting means and the end address of said end address register means, whereby an output address from said address counting means is supplied to said first memory means so as to start the reading operation from said first memory means and the comparing means generates a coincidence output which is supplied to said control means to thereby stop the counting operation of said address counting means.

* * * * *